United States Patent
Wolf et al.

(10) Patent No.: US 12,182,680 B1
(45) Date of Patent: Dec. 31, 2024

(54) CONTINUOUS INTEGRATION AND AUTOMATED TESTING OF MACHINE LEARNING MODELS

(71) Applicant: Blue Yonder Group, Inc., Scottsdale, AZ (US)

(72) Inventors: Moritz Wolf, Karlsruhe (DE); Martin Hahn, Karlsruhe (DE); Felix Christopher Wick, Thaleischweiler-Fröschen (DE)

(73) Assignee: Blue Yonder Group, Inc., Scottsdale, AZ (US)

( * ) Notice: Subject to any disclaimer, the term of this patent is extended or adjusted under 35 U.S.C. 154(b) by 910 days.

(21) Appl. No.: 17/114,825

(22) Filed: Dec. 8, 2020

Related U.S. Application Data (60) Provisional application No. 62/960,812, filed on Jan. 14, 2020.

(51) Int. Cl.
  *G06N 20/20*    (2019.01)
  *G06N 5/04*    (2023.01)
  *G06Q 10/087*    (2023.01)
  *G06Q 30/0202*    (2023.01)

(52) U.S. Cl.
  CPC .............. *G06N 20/20* (2019.01); *G06N 5/04* (2013.01); *G06Q 30/0202* (2013.01); *G06Q 10/087* (2013.01)

(58) Field of Classification Search
  CPC .......... G06N 20/00; G06N 20/20; G06N 5/04; G06Q 30/0202; G06Q 10/087
  See application file for complete search history.

(56) References Cited

U.S. PATENT DOCUMENTS

| | | | |
|---|---|---|---|
| 2014/0344557 A1* | 11/2014 | Bartlow | G05B 19/0426 |
| | | | 712/236 |
| 2020/0134364 A1* | 4/2020 | Kuruvilla | G06F 18/214 |
| 2020/0250584 A1* | 8/2020 | Wei | G06N 20/20 |
| 2020/0311750 A1* | 10/2020 | Gugnani | G06F 16/5838 |

OTHER PUBLICATIONS

Krishna, Akshay, et al. "Sales-forecasting of retail stores using machine learning techniques." 2018 3rd international conference on computational systems and information technology for sustainable solutions (CSITSS). IEEE, 2018. (Year: 2018).*

* cited by examiner

*Primary Examiner* — Eric Nilsson
(74) *Attorney, Agent, or Firm* — Spencer Fane LLP; Steven J. Laureanti (57) ABSTRACT

A system and method are disclosed to generate, modify, and deploy machine learning models. Embodiments include a database comprising historical sales data and a server comprising a processor and memory. Embodiments receive historical sales data comprising aggregated sales data for one or more items sold in one or more stores over one or more past time periods. Embodiments train a first machine learning model to learn model parameters and generate sales predictions by identifying one or more causal factors that influence the sale of one or more items. Embodiments train a second machine learning model, based on the first machine learning model, to generate second predictions. Embodiments evaluate the predictions of the first and second machine learning models as compared to the historical sales data, and deploy the machine learning model that generated the predictions that are closer to the historical sales data to generate one or more subsequent predictions.

20 Claims, 5 Drawing Sheets

CONTINUOUS INTEGRATION AND AUTOMATED TESTING OF MACHINE LEARNING MODELS

CROSS-REFERENCE TO RELATED APPLICATIONS

The present disclosure is related to that disclosed in the U.S. Provisional Application No. 62/960,812, filed Jan. 14, 2020, entitled "Continuous Integration and Automated Testing of Machine Learning Models." U.S. Provisional Application No. 62/960,812 is assigned to the assignee of the present application. The subject matter disclosed in U.S. Provisional Application No. 62/960,812 is hereby incorporated by reference into the present disclosure as if fully set forth herein. The present invention hereby claims priority under 35 U.S.C. § 119(e) to U.S. Provisional Application No. 62/960,812.

TECHNICAL FIELD

The present disclosure relates generally to data processing, and more in particular relates to data processing for retail and demand forecasting using machine learning with continuous integration and automated testing of machine learning models.

BACKGROUND

Machine learning techniques may generate one or more machine learning models that forecast demand for products sold at one or more retail locations over a defined time period, or that provide other forecasts based on historical data. To forecast demand, machine learning models may model the influence of exterior causal factors, such as, for example, known holidays, sales promotions, or incoming weather events that may make customer travel to and from a retail location difficult, on historical time series sales data. Machine learning techniques may also generate one or more machine learning models optimized for particular supply chain entities or datasets. However, machine learning models developed for one supply chain entity or dataset may be incompatible with datasets pertaining to other supply chain entities, and attempts to update two or more machine learning models optimized for different supply chain entities to incorporate new features may impair the functionality and accuracy of one or more machine learning models. Testing updates to two or more machine learning models optimized for different supply chain entities may require significant and undesirable runtime and oversight. Additionally, testing of machine learning models concerning the validity and accuracy of predictions, as well as the subsequent deployment to the production systems, are typically done manually and may require substantial effort and be prone to human errors.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide a model training system and method that generates one or more trained machine learning models that utilize one or more causal factors X and historical target time series data to predict a demand volume Y (target or label) for a particular product/location/date combination. The model training system and method modifies the one or more trained machine learning models according to the new development, in one or more feature branches, of a version-control system (such as, for example, git). The model training system and method automatically tests the predictions of the modified machine learning models against the predictions of the one or more trained machine models on the master branch of the version-control system to confirm the accuracy of the modified machine learning model predictions. Having verified the accuracy of one or more modified machine learning models, the model training system and method incorporates the new feature branch in a continuous integration process, and deploys the one or more modified machine learning models to one or more supply chain entities and/or planning and execution systems.

Embodiments automatically test modified machine learning models across a wide variety of available datasets and deploy the updated machine learning models, which in an embodiment may comprise updated feature branches as compared to the one or more trained machine learning models, to one or more supply chain entities and/or planning and execution systems. Embodiments track all modifications to one or more master branch trained machine learning models, and synchronize machine learning predictions provided to two or more supply chain entities.

According to embodiments, the data used for the continuous integration and automated testing of machine learning models may consist of several independent data sets, for example from different retailers, that are subsequently used for independent training, prediction, and test runs. Hereby, the machine learning model source code, which represents the machine learning model, is the same for all data sets. However, the same machine learning model trained on different data sets may generate different modified models. The decision of whether to incorporate a modified model on a new feature branch may then be made using independent evaluations of the various data sets. For simplicity and without loss of generality, in the following disclosure, the process is described as if performed on a single data set.

Figure 1:
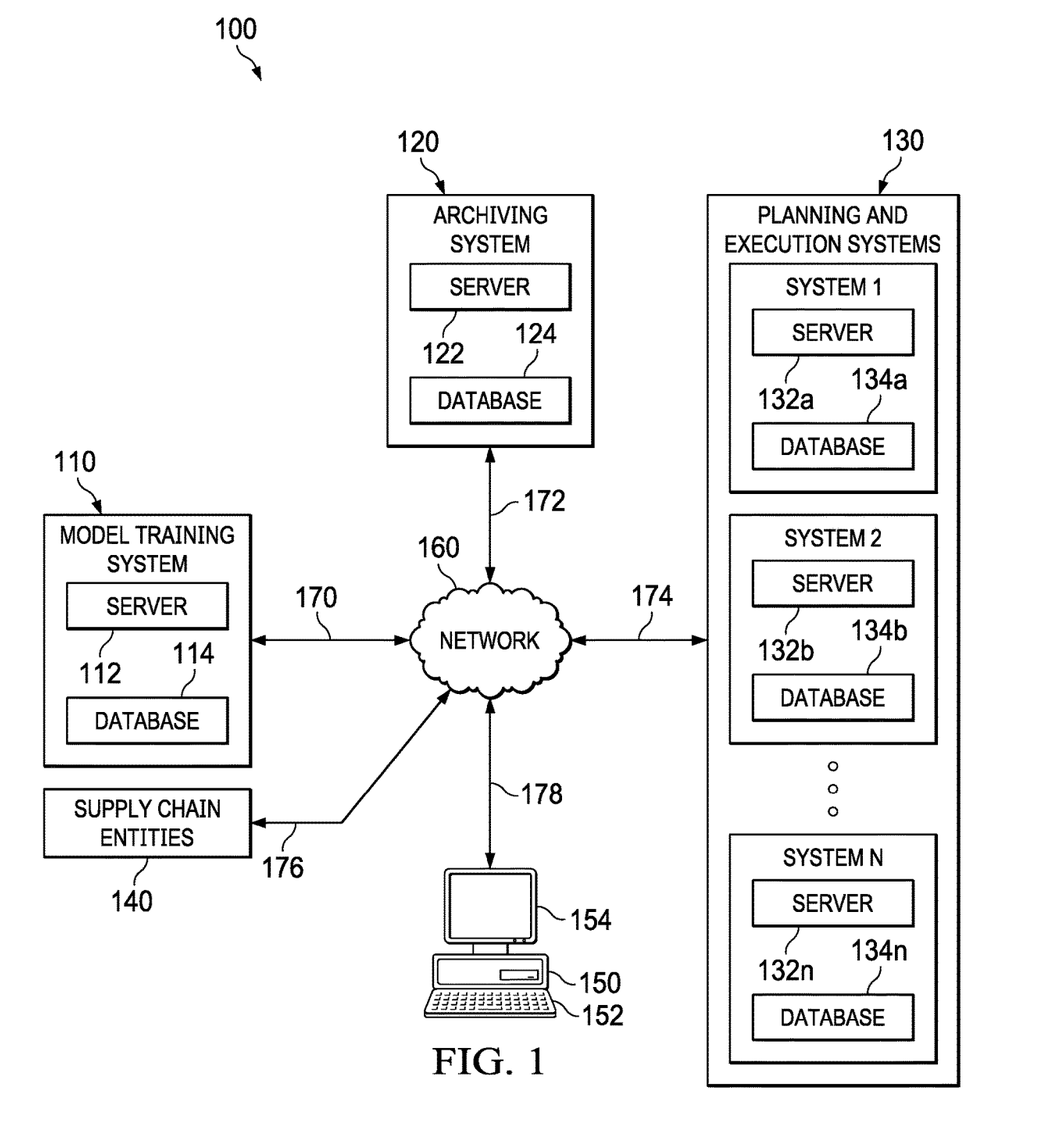
FIG. 1 illustrates an exemplary supply chain network, in accordance with a first embodiment.

FIG. 1 illustrates an exemplary supply chain network 100, in accordance with a first embodiment. Supply chain network 100 comprises model training system 110, archiving system 120, one or more planning and execution systems 130, one or more supply chain entities 140, computer 150, network 160, and communication links 170-178. Although single model training system 110, single archiving system 120, one or more planning and execution systems 130, one or more supply chain entities 140, single computer 150, and single network 160 are illustrated and described, embodiments contemplate any number of model training systems 110, archiving systems 120, one or more planning and execution systems 130, one or more supply chain entities 140, computers 150, or networks 160, according to particular needs.

In one embodiment, model training system 110 comprises server 112 and database 114. As described in more detail below, model training system 110 uses a machine learning method to (1) train a model to predict a demand volume Y (target or label) based on one or more causal factors and historical target time series data, (2) modify the trained model to incorporate new feature branches, (3) automatically test the predictions of the modified model against the predictions of the trained model, using historical data, to evaluate the validity and accuracy of the modified model predictions, and (4) if the modified model generates accurate predictions from the historical data, deploying the modified model to one or more supply chain entities 140 and/or planning and execution systems 130. Model training system 110 may receive historical data and current data from archiving system 120, one or more planning and execution systems 130, one or more supply chain entities 140, and/or computer 150 of supply chain network 100. In addition, server 112 comprises one or more modules that provide a user interface (UI) that displays visualizations identifying and quantifying the contribution of external causal factors and/or autocorrelated target time series data to an individual prediction.

Archiving system 120 of supply chain network 100 comprises server 122 and database 124. Although archiving system 120 is illustrated as comprising single server 122 and single database 124, embodiments contemplate any suitable number of servers 122 or databases 124 internal to or externally coupled with archiving system 120. Server 122 of archiving system 120 may support one or more processes for receiving and storing data from one or more planning and execution systems 130, one or more supply chain entities 140, and/or one or more computers 150 of supply chain network 100, as described in more detail herein. According to some embodiments, archiving system 120 comprises an archive of data received from one or more planning and execution systems 130, one or more supply chain entities 140, and/or one or more computers 150 of supply chain network 100. Archiving system 120 provides archived data to model training system 110 and/or planning and execution system 130 to, for example, train machine learning models or generate a prediction with a trained machine learning model. Server 122 may store the received data in database 124. Database 124 of archiving system 120 may comprise one or more databases 124 or other data storage arrangements at one or more locations, local to, or remote from, server 122.

According to an embodiment, one or more planning and execution systems 130 comprise one or more servers 132 and one or more databases 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 of one or more planning and execution systems 130 comprises one or more modules, such as, for example, a planning module, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As illustrated in FIG. 1, supply chain network 100 comprising model training system 110, archiving system 120, one or more planning and execution systems 130, and one or more supply chain entities 140 may operate on one or more computers 150 that are integral to or separate from the hardware and/or software that support model training system 110, archiving system 120, one or more planning and execution systems 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from model training system 110, archiving system 120, one or more planning and execution systems 130, and one or more supply chain entities 140. In addition, each of the one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with model training system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, manufacturers, suppliers, distribution centers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Distribution centers may be any entity that organizes the shipping, stockpiling, organizing, warehousing, and distributing of one or more products. Although one example of supply chain network 100 is illustrated and described, embodiments contemplate any configuration of supply chain network 100, without departing from the scope described herein.

In one embodiment, model training system 110, archiving system 120, one or more planning and execution systems 130, supply chain entities 140, and computer 150 may be coupled with network 160 using one or more communication links 170-178, which may be any wireline, wireless, or other link suitable to support data communications between model training system 110, archiving system 120, the planning and execution systems 130, supply chain entities 140, computer 150, and network 160 during operation of supply chain network 100. Although communication links 170-178 are illustrated as generally coupling model training system 110, archiving system 120, one or more planning and execution systems 130, one or more supply chain entities 140, and computer 150 to network 160, any of model training system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling model training system 110, archiving system 120, one or more planning and execution systems 130, one or more supply chain entities 140, and computer 150. For example, data may be maintained locally to, or externally of, model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using network 160 or in any other appropriate manner. For example, data may be maintained in a cloud database 114 at one or more locations external to model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks 160 and other components.

Although the disclosed systems and methods are described below primarily in connection with retail demand forecasting solely for the sake of clarity, the systems and methods herein are applicable to many other applications for predicting a demand volume from a set of causal factors and/or historical data, including, for example, future stock and housing prices, insurance churn predictions, and drug discovery.

Figure 2:
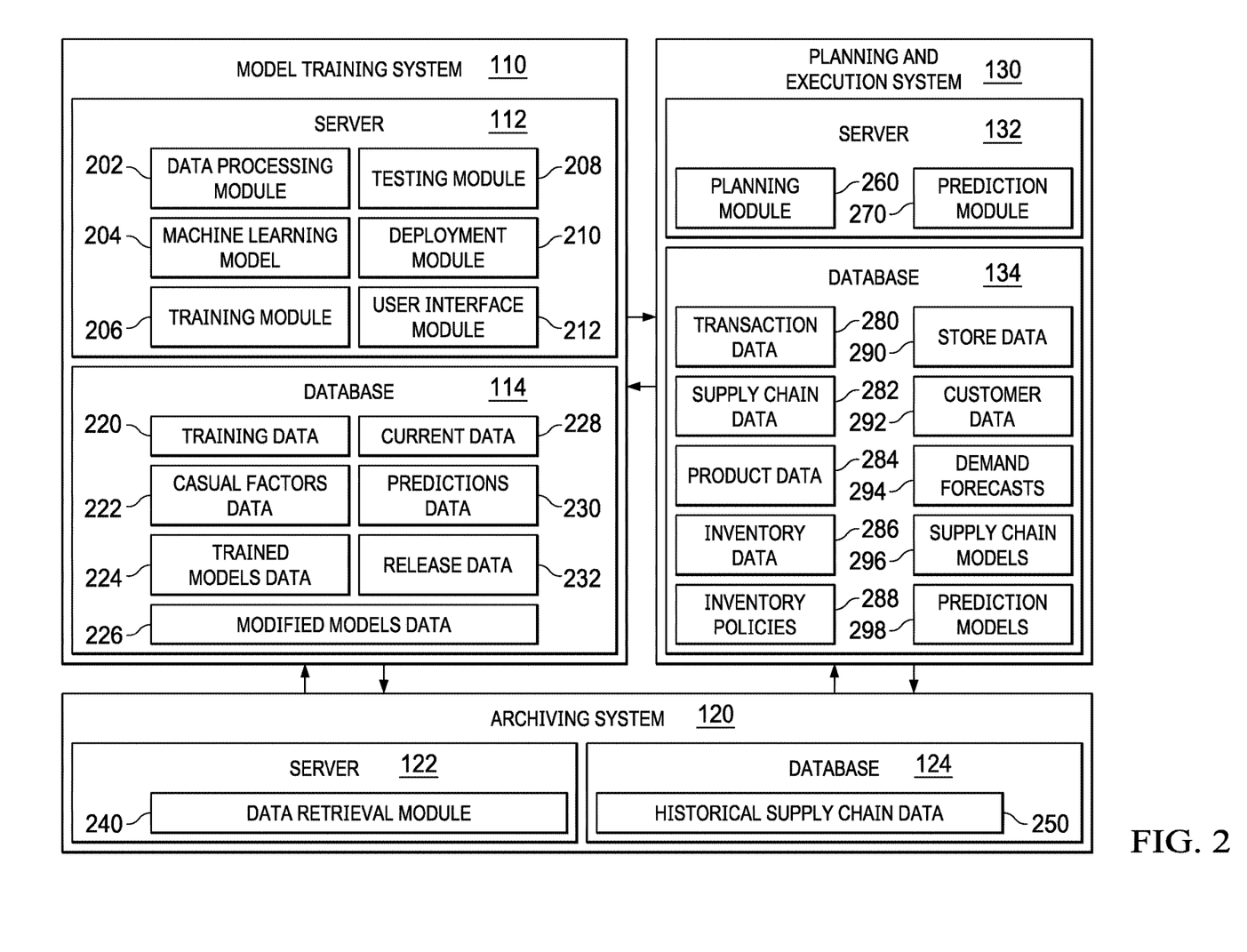
FIG. 2 illustrates the model training system, archiving system, and planning and execution system of FIG. 1 in greater detail, according to an embodiment.

FIG. 2 illustrates model training system 110, archiving system 120, and planning and execution system 130 of FIG. 1 in greater detail, according to an embodiment. Model training system 110 may comprise server 112 and database 114, as described above. Although model training system 110 is illustrated as comprising single server 112 and single database 114, embodiments contemplate any suitable number of servers 112 or databases 114 internal to or externally coupled with model training system 110.

Server 112 of model training system 110 comprises data processing module 202, machine learning model 204, training module 206, testing module 208, deployment module 210, and user interface module 212. Although server 112 is illustrated and described as comprising single data processing module 202, single machine learning model 204, single training module 206, single testing module 208, single deployment module 210, and single user interface module 212, embodiments contemplate any suitable number or combination of these located at one or more locations, local to, or remote from model training system 110, such as on multiple servers 112 or computers 150 at one or more locations in supply chain network 100.

Database 114 of model training system 110 may comprise one or more databases 114 or other data storage arrangements at one or more locations, local to, or remote from, server 112. In an embodiment, database 114 comprises training data 220, causal factors data 222, trained models data 224, modified models data 226, current data 228, predictions data 230, and release data 232. Although database 114 is illustrated and described as comprising training data 220, causal factors data 222, trained models data 224, modified models data 226, current data 228, predictions data 230, and release data 232, embodiments contemplate any suitable number or combination of these, located at one or more locations, local to, or remote from, model training system 110 according to particular needs.

In one embodiment, data processing module 202 receives data from archiving system 120, supply chain planning and execution systems 130, one or more supply chain entities 140, one or more computers 150, or one or more data storage locations local to, or remote from, supply chain network 100 and model training system 110, and prepares the data for use in training one or more machine learning models and/or one or more trained models. Data processing module 202 prepares received data for use in training and prediction by checking received data for errors and transforming the received data. Data processing module 202 may check received data for errors in the range, sign, and/or value and may use statistical analysis to check the quality or the correctness of the data. According to embodiments, data processing module 202 transforms the received data to normalize, aggregate, and/or rescale the data to allow direct comparison of received data from different supply chain entities 140 and/or planning and execution systems 130. Data processing module 202 may perform default pre-processing on the received data to prepare the received data for model training system 110, and/or may perform entity-specific pre-processing on data received from specific supply chain entities 140, planning and execution systems 130, or other locations in supply chain network 100.

Machine learning model 204 comprises an untrained model that may be trained by training module 206 to generate the trained models by identifying causal factors from historical time series data. According to one embodiment, machine learning model 204 is trained from training data 220 to predict a demand volume Y (target or label) from a set of identified causal factors X that describe the strength of each factor variable contributing to the model prediction, and/or historical target time series data.

Training module 206 uses training data 220 to train machine learning model 204 by identifying causal factors from historical time series data and generating the trained models. Training module 206 may train machine learning model 204 to predict one or more demand volumes for one or more product/location/date combinations using causal factors stored in causal factors data 222 and/or historical target time series data stored in training data 220. In an embodiment, training module 206 may use a cyclic boosting process to train machine learning model 204 to predict one or more demand volumes. Training module 206 stores the one or more trained models in trained models data 224 of database 114.

Figure 4:
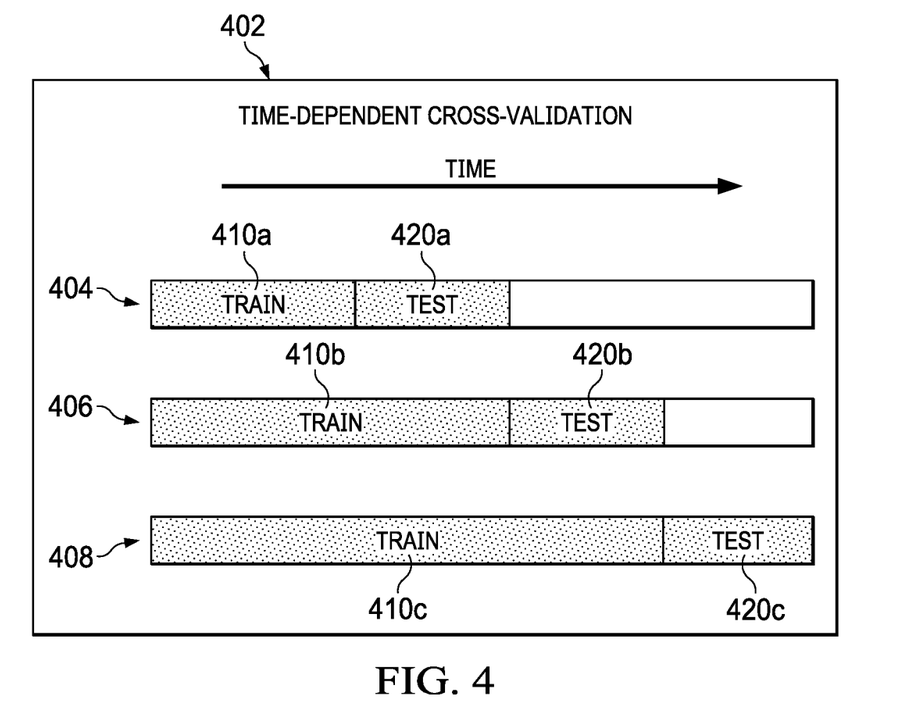
FIG. 4 illustrates a time-dependent cross-validation process, according to an embodiment.

Testing module 208 may use training data 220, causal factors data 222, and/or current data 228 to compare the predictions generated by one or more trained models, stored in trained models data 224, to the predictions generated by one or more modified models, stored in modified models data 226. In an embodiment, testing module 208 may access one or more trained models stored in trained models data 224, and one or more modified models stored in modified models data 226. Testing module 208 may apply training data 220 and/or current data 228 to the one or more trained models and one or more modified models to generate trained model predictions and modified model predictions. Testing module 208 may store the trained model predictions and modified model predictions in predictions data 230 of database 114. In an embodiment, testing module 208 may apply training data 220 to the one or more trained models and one or more modified models in a time-dependent cross-validation back-test process, as illustrated by FIG. 4. In other embodiments, testing module 208 may apply training data 220 and/or current data 228 to the one or more trained models and one or more modified models in any process, including but not limited to a cross-validation process.

In an embodiment, testing module 208 applies samples of current data 228 and/or training data 220 to one or more trained models and one or more modified models to generate predicted demand volumes for one or more product/location/date combinations. Testing module 208 may compare the demand volumes predicted by the one or more trained models with the demand volumes predicted by the one or more modified models to assess the accuracy of the one or more modified models. According to some embodiments, testing module 208 generates predictions using the one or more trained models and/or one or more modified models at daily intervals. However, embodiments contemplate longer and shorter prediction phases that may be performed, for example, weekly, twice a week, twice a day, hourly, or the like.

Testing module 208 may use a continuous integration process to automatically test the predictions of modified models against the predictions of trained models and/or historical data truth without additional input from one or more computers 150 and/or one or more user interface modules 212. According to embodiments, testing module 208 may automatically test all modified models hourly, daily, weekly, twice weekly, or at any other time interval. In other embodiments, testing module 208 may automatically test each modified model against one or more trained models as soon as the modified model is created and stored in modified models data 226.

Deployment module 210 may update one or more trained models stored in trained models data 224 to incorporate one or more new feature branches associated with one or more modified models stored in modified models data 226. In an embodiment in which a modified model tests a single new feature branch (as compared to a master trained model), and testing module 208 determines that the modified model generates demand predictions in a more accurate manner than the master trained model, deployment module 210 may update the trained model to include the new feature branch from the modified model. Having updated the trained model, deployment module 210 may deploy the updated trained model to one or more supply chain entities 140 and/or one or more planning and execution systems 130.

User interface module 212 of model training system 110 generates and displays a user interface (UI), such as, for example, a graphical user interface (GUI), that displays one or more interactive visualizations of predictions and the contribution from one or more causal factors or historical time series data to the predictions. According to embodiments, user interface module 212 displays a GUI comprising interactive graphical elements for selecting one or more items, stores, or products and, in response to the selection, displaying one or more graphical elements identifying one or more causal factors and/or the relative importance of the one or more causal factors to the estimated demand prediction. Further, user interface module 212 may display interactive graphical elements provided for modifying future states of the one or more identified causal factors, and, in response to modifying the one or more future states of the causal factors, modifying input values to represent a future scenario corresponding to the modified futures states of the one or more causal factors. For example, embodiments of user interface module 212 provide "what if" scenario modeling and prediction for modifying a future weather variable to identify and calculate the change in a prediction based on a change in weather using historical weather data and related historical supply chain data 250. As an example only and not by way of limitation, demand for plywood changes dramatically when a hurricane is predicted to strike a particular region. To predict the influence of a hurricane on sales, model training system 110 modifies input values to represent a future scenario modeled by the "what if" scenario. In other embodiments, model training system 110 predicts, for example, the influence of one or more upcoming or potential promotions. A proper distinction between causal factors and lagged target information may be crucial for what if scenarios, because the target autocorrelation is a spurious correlation due to the effect of the causal factors.

Figure 5:
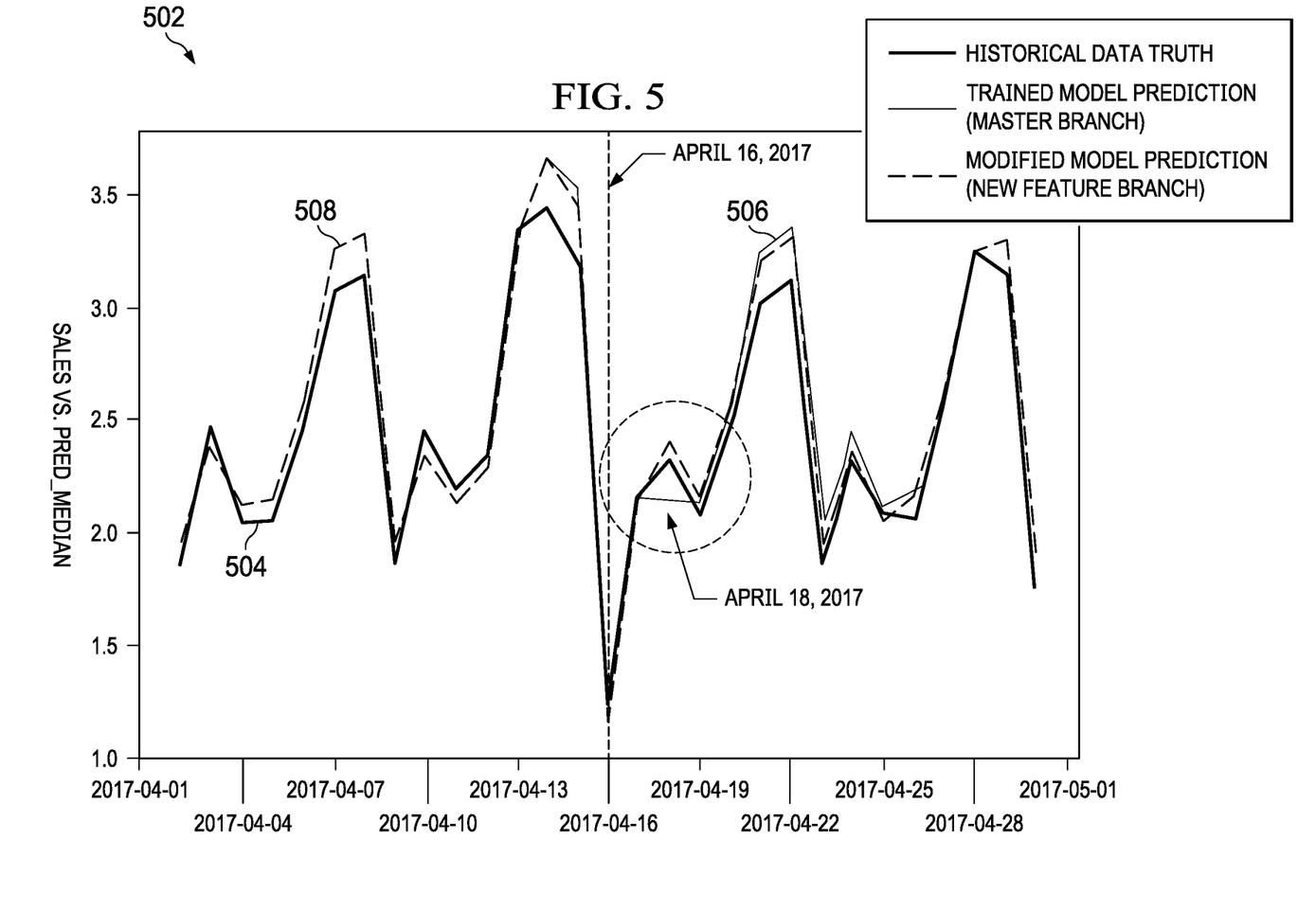
FIG. 5 illustrates a prediction comparison display, according to an embodiment.

In an embodiment, user interface module 212 may also generate a report, which may include visualizations (including but not limited to the prediction comparison display illustrated by FIG. 5), and may also include any kind of accuracy measures such as, in an embodiment, the mean absolute deviation between the predictions and the actual target, to compare the quality of the predictions from the trained models with the predictions from the one or more modified models in a time-dependent cross-validation backtest scenario.

Training data 220 of model training system 110 database 114 comprises a selection of one or more periods of historical supply chain data aggregated or disaggregated at various levels of granularity and presented to machine learning model 204 to generate trained models. According to one embodiment, training data 220 comprises historic sales patterns, prices, promotions, weather conditions, and other factors influencing future demand of a particular item sold in a given store on a specific day. Training data 220 may also comprise time series data, such as, for example, a list of products sold at various locations or retailers at recorded dates and times. As described in more detail below, model training system 110 may receive training data 220 from archiving system 120, one or more supply chain planning and execution systems 130, one or more supply chain entities 140, computer 150, or one or more data storage locations local to, or remote from, supply chain network 100 and model training system 110.

Causal factors data 222 comprises one or more causal factors identified by training module 206 in the process of training one or more machine learning models and/or generating the one or more trained models. For the purposes of training one or more machine learning models and/or one or more trained models, causal factors represent exterior factors that may positively or negatively influence the sales of one or more items over one or more time periods and/or on one or more dates. As an example only and not by way of limitation, a causal factor may comprise a "Black Friday" sales day, on which, traditionally, American shoppers predictably shop and spend at a far higher rate than other sales days. Training module 206 may identify the "Black Friday" sales pattern in training data 220 by identifying that the day after "Thanksgiving Day" results in very high customer shopping and spending rates, and may store the "Black Friday" sales pattern as a causal factor in causal factors data 222.

According to embodiments, causal factors may comprise, for example, any exterior factor that positively or negatively influences the sales of one or more items over one or more time periods, such as: sales promotions, sales coupons, sales days, sales bundles, traditional heavy shopping days (such as but not limited to "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week (as a causal factor and not as lagged target time series information), or other factors influencing sales. In an embodiment, causal factors may occur on the day of the target volume to be predicted in a horizon-independent manner. For example, in an embodiment in which a trained model predicts, on Nov. 1, 2019, a sales volume Y that will occur on "Black Friday," Nov. 29, 2019, the trained model may utilize the "Black Friday" causal factor to predict sales on Nov. 29, 2019, even though the "Black Friday" causal factor has not yet occurred on the Nov. 1, 2019 date of the prediction.

Trained models data 224 comprises one or more machine learning models trained by training module 206 to predict demand volumes (such as, for example, future product demand quantities) along with causal factors and the contributing strength of each causal factor variable in contributing to the predicted demand.

Modified models data 226 comprises one or more modified machine learning models 204. In an embodiment, a modified model may comprise a trained model that model training system 110 has modified to incorporate one or more new feature branches that the original trained model lacks. New feature branches may comprise source code alterations, new programs, new causal factors, new prediction rules, or any other changes to a trained model that alter the final prediction output of the trained model (for the purposes of this disclosure, the trained model may comprise the master branch from which one or more new feature branches are generated). As an example only and not by way of limitation, user interface module 212 may respond to one or more computer inputs, including but not limited to input to one or more computer mice and/or keyboards, to (1) select a trained model stored in trained models data 224, (2) alter the source code of the trained model to incorporate one or more new feature branches, thereby creating a modified model, and (3) store the modified model in modified models data 226.

Current data 228 comprises data used by the one or more trained models and/or one or more modified models to generate a predicted demand for one or more product/location/date combinations. According to embodiments, current data 228 comprises current sales patterns, prices, promotions, weather conditions, and other current factors influencing demand of a particular product sold in a given store location on a specific day. One or more trained models and/or one or more modified models may access current data 228, output a predicted demand for one or more product/location/date combinations, and store the predicted demand in predictions data 230. Predictions data 230 comprises one or more predicted demands generated by the one or more trained models and/or one or more modified models.

Release data 232 may comprise data regarding the modification history of one or more trained models and one or more modified models. For example, in an embodiment, release data 232 stores every trained model generated by training module 206 and every modified model generated by user interface module 212, as well as the dates, times, and associated version upgrade history data pertaining to each instance in which deployment module 210 updates one or more trained models to incorporate one or more new feature branches from one or more modified models. Release data 232 may also comprise deployment history data that specifies the dates and times at which deployment module 210 deploys one or more trained models to one or more supply chain entities 140 and/or one or more planning and execution systems 130.

As described above, archiving system 120 comprises server 122 and database 124. Although archiving system 120 is illustrated as comprising single server 122 and single database 124, embodiments contemplate any suitable number of servers 122 or databases 124 internal to or externally coupled with archiving system 120.

Server 122 comprises data retrieval module 240. Although server 122 is illustrated and described as comprising single data retrieval module 240, embodiments contemplate any suitable number or combination of data retrieval modules 240 located at one or more locations, local to, or remote from archiving system 120, such as on multiple servers 122 or computers 150 at one or more locations in supply chain network 100.

In one embodiment, data retrieval module 240 receives historical supply chain data 250 from one or more supply chain planning and execution systems 130 and one or more supply chain entities 140, and stores received historical supply chain data 250 in archiving system 120 database 124. According to one embodiment, data retrieval module 240 of model training system 110 may prepare historical supply chain data 250 for use as training data 220 of model training system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as the historical supply chain data 250.

Database 124 may comprise one or more databases or other data storage arrangements at one or more locations, local to, or remote from, server 122. Database 124 comprises, for example, historical supply chain data 250. Although database 124 is illustrated and described as comprising historical supply chain data 250, embodiments contemplate any suitable number or combination of data, located at one or more locations, local to, or remote from, archiving system 120, according to particular needs.

Historical supply chain data 250 comprises historical data received from model training system 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, planning and execution system 130 comprises server 132 and database 134. Although planning and execution system 130 is illustrated as comprising single server 132 and single database 134, embodiments contemplate any suitable number of servers 132 or databases 134 internal to or externally coupled with planning and execution system 130.

Server 132 comprises planning module 260 and prediction module 270. Although server 132 is illustrated and described as comprising single planning module 260 and single prediction module 270, embodiments contemplate any suitable number or combination of planning modules 260, prediction modules 270, and/or other modules located at one or more locations, local to, or remote from planning and execution system 130, such as on multiple servers 112 or computers 150 at one or more locations in supply chain network 100.

Database 134 may comprise one or more databases or other data storage arrangements at one or more locations, local to, or remote from, server 132. Database 134 comprises, for example, transaction data 280, supply chain data 282, product data 284, inventory data 286, inventory policies 288, store data 290, customer data 292, demand forecasts 294, supply chain models 296, and prediction models 298. Although database 134 is illustrated and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 260 works in connection with prediction module 270 to generate a plan based on one or more predicted retail volumes, classifications, or other predictions. By way of example and not of limitation, planning module 260 may comprise a demand planner that generates a demand forecast for one or more supply chain entities 140. Planning module 260 may generate the demand forecast, at least in part, from predictions and calculated factor values for one or more causal factors received from prediction module 270. By way of a further example, planning module 260 may comprises an assortment planner and/or a segmentation planner that generates product assortments that match causal effects calculated for one or more customers or products by prediction module 270, which may provide for increased customer satisfaction and sales, as well as reducing costs for shipping and stocking products at stores where they are unlikely to sell.

Prediction module 270 applies samples of transaction data 280, supply chain data 282, product data 284, inventory data 286, store data 290, customer data 292, demand forecasts 294, and other data to prediction models 298 to generate predictions and calculated factor values for one or more causal factors. As described above in connection with prediction module 270 of model training system 110, prediction module 270 predicts a volume Y (target or label) from a set of causal factors X along with causal factors strengths that describe the strength of each causal factor variable contributing to the predicted volume. According to some embodiments, prediction module 270 generates predictions at daily intervals. However, embodiments contemplate longer and shorter prediction phases that may be performed, for example, weekly, twice a week, twice a day, hourly, or the like.

Transaction data 280 of database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of model training system 110.

Inventory policies 288 may comprise any suitable inventory policy describing the reorder point and target quantity, or other inventory policy parameters that set rules for model training system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a certain probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, model training system 110 and/or planning and execution system 130 may determine a replenishment order according to one or more replenishment rules, which, among other things, indicates to one or more supply chain entities 140 to determine or receive inventory to replace the depleted inventory. As an example only and not by way of limitation, an inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, one or more machine learning models also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately $2\times10^{\wedge}10$ demand forecasts 294 each day to derive the optimal order volume for the next delivery cycle (e.g. three days).

Supply chain models 296 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model configuration. Prediction models 298 comprise one or more of the modified models used by planning and execution system 130 for predicting a retail volume, such as, for example, a forecasted demand volume for one or more items at one or more stores of one or more retailers.

Figure 3:
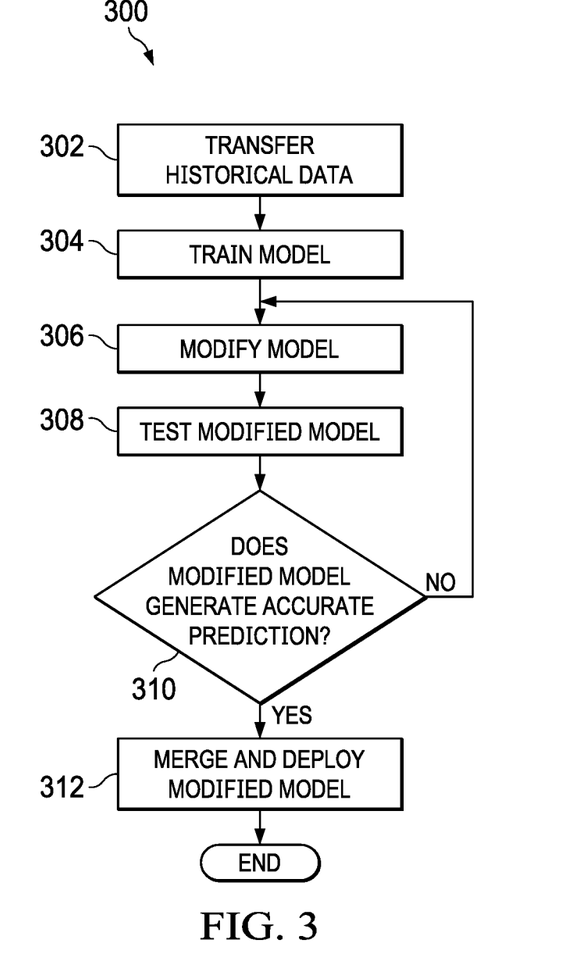
FIG. 3 illustrates an exemplary method, according to an embodiment.

FIG. 3 illustrates exemplary method 300, according to an embodiment. Method 300 may comprise generating a trained machine learning model, modifying the trained model to incorporate one or more new feature branches, testing the predictions of the trained and modified models using historical data, confirming the accuracy of the modified model predictions, and deploying the modified model to one or more supply chain entities 140 and/or one or more planning and execution systems 130. Method 300 may proceed by one or more actions, which although described in a particular order, may be performed in one or more permutations, according to particular needs.

At action 302, data processing module 202 of model training system 110 server 112 transfers historical supply chain data 250 from archiving system 120, and/or transaction data 280, supply chain data 282, product data 284, inventory data 286, store data 290, and/or customer data 292 from one or more planning and execution systems 130, into training data 220 of model training system 110 database 114. In other embodiments, data retrieval module 240 of archiving system 120 may transfer historical supply chain data 250 from archiving system 120 to training data 220 of model training system 110 database 114. In an embodiment, historical supply chain data 250 may consist of several independent data sets, for example from different retailers, which are subsequently used for independent training, prediction, and test runs. Data processing module 202 may perform default pre-processing on the received data to transfer the received data into training data 220, and/or may perform entity-specific pre-processing on data received from specific supply chain entities 140, planning and execution systems 130, or other locations in supply chain network 100.

At action 304, training module 206 generates one or more trained models using training data 220. In an embodiment, training module 206 accesses training data 220 and one or more specified product/location/date combinations that may be stored therein, and uses training data 220 to train machine learning model 204 and generate one or more trained models by identifying, from training data 220, one or more causal factors as well as the strengths with which each of the one or more causal factors contributes to the predicted demand volume of the one or more trained models. According to embodiments, training module 206 may use any machine learning process, including but not limited to a cyclic boosting process, to identify one or more causal factors, train machine learning model 204, and/or generate one or more trained models. Training module 206 identifies causal factors and stores the causal factors in causal factors data 222. Training module 206 stores the one or more trained models in trained models data 224.

At action 306, user interface module 212 generates one or more modified models based on the one or more trained models, with the addition of one or more new feature branches. In an embodiment, user interface module 212 responds to one or more computer 150 inputs, including but not limited to input to one or more computer mice and/or keyboards, to (1) select a trained model stored in trained models data 224, (2) alter the source code of the trained model to incorporate one or more new feature branches, thereby creating a modified model, and (3) store the modified model in modified models data 226 of database 114. In other embodiments, one or more computers 150 of supply chain network 100 may access the trained models stored in trained models data 224, modify one or more trained models to incorporate one or more new feature branches, and store the one or more modified models in modified models data 226 of database 114. In an embodiment, after user interface module 212 makes one or more source code alterations to a trained model to create a new modified model, training module 206 trains the new modified model using a time-dependent selection of cross-validation historical data stored in training data 220, as illustrated by FIG. 4.

At action 308, testing module 208 tests the accuracy of the predictions generated by the one or more modified models against the baseline predictions provided by one or more trained models. The new feature branches introduced to the one or more modified models at action 306 may or may not improve the accuracy of the modified model demand predictions. To test the one or more modified models, testing module 208 may apply historical time series data stored in training data 220 and/or current data 228 to the one or more trained models and one or more modified models to generate trained model predictions and modified model predictions. Testing module 208 may store the trained model predictions and modified model predictions in predictions data 230 of database 114. In an embodiment, testing module 208 may apply training data 220 and/or current data 228 to the one or more trained models and one or more modified models in a time-dependent cross-validation process, as described in greater detail below.

At action 310, testing module 208 determines whether the one or more modified models generated accurate demand predictions. In an embodiment, testing module 208 accesses predictions data 230 and compares the predictions generated by the one or more trained models directly to the predictions generated by the one or more modified models. In another embodiment, the testing model compares the predictions generated by the one or more trained models and modified models with known historical data truth, and measures the discrepancy between the truth and the predictions generated by the one or more trained models and modified models. In this embodiment, if training module 206 determines the trained model generated a more accurate prediction (closer to the truth) than the modified model, model training system 110 returns to action 306 and continues generating modified models. If, on the other hand, training module 206 determines that the modified model and the one or more new feature branches contained in the modified model generated a more accurate prediction (closer to the truth), model training system 110 proceeds to action 312.

At action 312, deployment module 210 merges the one or more new feature branches and then deploys the modified model in supply chain network 100. Deployment module 210 updates one or more trained models stored in trained models data 224 to incorporate the one or more feature branches of the one or more modified models stored in modified models data 226. Having updated the trained model, deployment module 210 may deploy the updated trained model to one or more supply chain entities 140 and/or one or more planning and execution systems 130 to generate future demand or quantity predictions, and may store data related to the deployment of the updated trained model in release data 232 of database 114. Model training system 110 then terminates method 300.

To illustrate the operation of model training system 110 generating a trained machine learning model 204, modifying the model to incorporate a new feature branch, testing the predictions of the trained and modified models using historical data, confirming the accuracy of the modified model predictions, and deploying a trained model updated with the new feature branch to several supply chain entities 140 and/or one or more planning and execution systems 130, the following example is now given. In this example, model training system 110 generates trained and modified models to predict the sale of scented candles at a retail location (Store X) during the month of April, which may include, depending on the year, the Easter holiday (for example, in some calendar years, Easter occurs in March). Although particular examples of model training system 110, trained models, and modified models are illustrated and described herein, embodiments contemplate model training system 110 executing the actions of method 300 to identify any causal factors, generate any trained models and modified models, and deploy modified models to one or more supply chain entities 140 and/or planning and execution systems 130, according to particular needs.

In this example, at action 302, data processing module 202 of model training system 110 server 112 transfers historical product sales data, comprising product sales data from a plurality of supply chain entities 140 and planning and execution systems 130, from archiving system 120 into training data 220 of model training system 110 database 114.

Continuing with this example, at action 304, training module 206 generates a trained model using training data 220. In this example, training module 206 accesses training data 220 and uses training data 220 to train machine learning model 204 and generate a trained model by identifying, from training data 220, one or more causal factors as well as the strengths with which each of the one or more causal factors contributes to the predicted demand output of the trained model. In this example, training module 206 uses a machine learning cyclic boosting process to identify one or more causal factors, train machine learning model 204, and generate a trained model. Training module 206 identifies causal factors and stores the causal factors in causal factors data 222. Training module 206 stores the trained model (referred to in this example as the "Master Model") in trained models data 224. For the sake of simplicity in this example, user interface module 212, responding to computer keyboard input, selects predictions and sales of scented candles at Store X during the month of April as the particular product/location/date combination to be evaluated. In other embodiments, model training system 110 performs the actions of method 300 on all available data. In this example, the Master Model does not identify the Easter holiday and the days immediately following the Easter holiday as one or more causal factors that may influence sales of scented candles at Store X in April months in which Easter occurs.

Continuing with this example, at action 306, user interface module 212 generates a modified model based on the Master Model, with the addition of a new feature branch that identifies the Easter holiday and the days immediately following the Easter holiday as one or more causal factors that influence sales of scented candles at Store X in April months in which Easter occurs. User interface module 212 responds to computer mouse and keyboard inputs to select the Master Model stored in trained models data 224, update the source code of the Master Model to incorporate the Easter holidays model new feature branch, and store the modified model comprising the Easter holidays model new feature branch (referred to in this example as the "Easter Model") in modified models data 226 of database 114.

Continuing with this example, at action 308 of method 300, testing module 208 automatically tests the accuracy of the predictions generated by the Easter Model against the baseline predictions provided by the Master Model. In this example, testing module 208 accesses training data 220 and applies historical time series data stored in training data 220 to the Master Model and the Easter Model to generate Master Model predictions and Easter Model predictions. In this example, model training system 110 utilizes time-dependent cross-validation process 402, illustrated by FIG. 4, to train and test the Easter Model.

FIG. 4 illustrates time-dependent cross-validation process 402, according to an embodiment. Time-dependent cross-validation process 402 may be generated as a graphical user interface by user interface module 212 for display on one or more computers 150, according to embodiments. Time-dependent cross-validation process 402 for training and testing comprises testing module 208 accessing the historical time series data stored in training data 220 and breaking the historical time series data into training blocks 410a-410c and testing blocks 420a-420c, where testing blocks 420a-420c occur after training blocks 410a-410c chronologically. Although particular examples of time-dependent cross-validation processes 402, historical time series data training blocks 410a-410c, and testing blocks 420a-420c are illustrated and described, embodiments contemplate training module 206 using any method to train one or more modified models, and testing module 208 using any method 300 to test one or more modified models, according to particular needs. Similarly, embodiments contemplate user interface module 212 generating time-depending cross-validation processes 402 and accompanying graphical user interface displays in any configuration and displaying any data, according to particular needs.

Continuing with the example, training module 206 accesses the historical time series data stored in training data 220, three copies of which are illustrated in time-dependent cross-validation process 402 as horizontal bars 404, 406, and 408. Training module 206 divides the historical time series data into training blocks 410a (for horizontal bar 404), 410b (for horizontal bar 406), and 410c (for horizontal bar 408), and testing blocks 420a (for horizontal bar 404), 420b (for horizontal bar 406), and 420c (for horizontal bar 408), and trains the Easter Model using training blocks 410a-410c. Testing module 208 then tests the Easter Model using testing blocks 420a-420c. In this way, training module 206 and testing module 208 train and test the Easter Model using different chronological segments of three copies of the same historical time series data (illustrated in time-dependent cross-validation process 402 as horizontal bars 404, 406, and 408) and compare the predictions generated by the Easter Model to the true results stored in the historical time series data. Testing module 208 stores the predictions generated by the Easter Model and Master Model in predictions data 230 of database 114.

Continuing the example, at action 310, testing module 208 determines whether the trained Easter Model, incorporating the Easter holidays model new feature branch, generates predictions that are closer to the known historical data truth than the predictions generated by the Master Model. In this example, testing module 208 accesses predictions data 230 and compares the predictions generated by the Easter Model directly to (1) the predictions generated by the Master Model, and (2) the known historical data truth for previous sales, stored in training data 220, of scented candles at Store X during the month of April. Testing module 208 and user interface module 212 generate prediction comparison display 502, illustrated by FIG. 5, to compare the predictions of the Easter Model and Master Model to known historical data truth.

FIG. 5 illustrates prediction comparison display 502, according to an embodiment. Prediction comparison display 502 may illustrate predictions 506 of the Master Model trained model and predictions 508 of the Easter Model modified model as compared to known historical data truth 504, according to an embodiment. Continuing the example, in this embodiment, testing module 208 accesses training data 220 and applies historical time series data for April 2017 stored in training data 220 to the Master Model and the Easter Model. Although in this embodiment prediction comparison display 502 illustrates predictions 506 generated by the Master Model and predictions 508 generated by the Easter Model as compared to known April 2017 historical data truth 504, embodiments contemplate testing module 208 and user interface module 212 generating prediction comparison displays 502 of any format and displaying any predictions and/or data, according to particular needs.

Continuing the example, and as illustrated in FIG. 5, historical data truth 504 exhibits a local peak on Tuesday Apr. 18, 2017, after Easter occurs on the 16th. The Master Model, which does not identify the Easter holiday and the days immediately following the Easter holiday as one or more causal factors that may influence demand of scented candles at Store X, fails to predict increased scented candle sales on Apr. 18, 2017, indicated by the lack of a local peak in predictions 506 for Apr. 18, 2017. In contrast, the Easter Model, which does incorporate the Easter holiday and the days immediately following the Easter holiday as one or more causal factors that influence demand of scented candles at Store X, does predict increased scented candle sales on Apr. 18, 2017, indicated by a local peak in predictions 508 for Apr. 18, 2017, as compared to historical data truth 504. Even though the Easter Model in fact over-predicts increased sales on Apr. 18, 2017, its prediction 508 is closer to historical data truth 504 than is prediction 506 made by the Master Model. Testing module 208 measures the discrepancy between the truth and the predictions generated by the Master Model and the Easter Model, and determines the Easter Model generated a more accurate prediction (closer to the truth) than did the Master Model. Model training system 110 proceeds to action 312.

Concluding this example, at action 312, deployment module 210 merges the source code of the new feature branch of the Easter Model to the master branch and in turn deploys the Easter Model in supply chain network 100. After performing independent trainings for the different data sets from, in this example, three different retailers on the full historical data sets rather than the piecewise trainings of the time-dependent cross-validation, deployment module 210 updates the three Master Models stored in trained models data 224 for each retailer to incorporate the Easter holidays model new feature branch, and stores the newly-updated Master Models in trained models data 224. Having updated the Master Model, deployment module 210 deploys the updated Master Model to, in this example, three separate supply chain entities 140 and planning and execution systems 130 to generate future demand predictions. Deployment module 210 stores data related to the deployment of the updated Master Model in release data 232 of database 114. Model training system 110 then terminates method 300.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method, comprising:
receiving, with a server comprising a processor and memory, historical time series sales data comprising aggregated sales data for one or more items sold in one or more stores over one or more past time periods, wherein the one or more stores maintain an inventory of one or more items at one or more stocking locations;
training a first machine learning model to learn model parameters by identifying one or more causal factors that influence the sale of one or more items at one or more stores over one or more time periods, and to generate first predictions of the sales of one or more items in relation to one or more causal factors;
training a second machine learning model, based on the first machine learning model, to generate second predictions of the sales of one or more items, wherein the second machine learning model is trained to test a new feature branch, wherein the new feature branch comprises one or more new causal factors, the one or more new causal factors each describing a strength of a factor variable contributing to the second predictions, and wherein the second machine learning model is trained using different chronological segments of the historical time series sales data;
evaluating the predictions of the first and second machine learning models as compared to the historical time series sales data; and
deploying the machine learning model that generated the predictions that are closer to the historical time series sales data to generate one or more subsequent predictions.

2. The computer-implemented method of claim 1, further comprising, after deploying the machine learning model that generated the predictions that are closer to the historical time series sales data to generate one or more subsequent predictions:
predicting, with the deployed machine learning model, one or more demand quantities during a prediction period by training the deployed machine learning model on historical supply chain data assigned to a training period, wherein the training period is earlier than the prediction period, and each of the one or more demand quantities is associated with at least one item of the one or more items and at least one stocking location of the one or more stocking locations during the prediction period; and
rendering, for display on a user interface, a demand prediction visualization comprising a predicted demand and features identified during training of the deployed machine model that influenced the predicted value.

3. The computer-implemented method of claim 1, wherein a time-dependent cross-validation process evaluates the predictions of the first and second machine learning models as compared to the historical time series sales data.

4. The computer-implemented method of claim 3, wherein an automatic continuous integration process, drawing information from sets of data from two or more supply chain entities, tests the generality of the predictions generated by the first and second machine learning models.

5. The computer-implemented method of claim 4, further comprising the second machine learning model incorporating one or more feature branches present in the first machine learning model, and one or more feature branches not present in the first machine learning model.

6. The computer-implemented method of claim 5, further comprising tracking the feature branches of the first and second machine learning models with a version-control system.

7. The computer-implemented method of claim 6, further comprising training the first and second machine learning models using a cyclic boosting process.

8. A system, comprising:
a database comprising historical time series sales data, the historical time series sales data comprising aggregated sales data for one or more items sold in one or more stores over one or more past time periods, wherein the one or more stores maintain an inventory of one or more items at one or more stocking locations; and
a server comprising a processor and memory and configured to:
receive, from the database, the historical time series sales data comprising aggregated sales data for one or more items sold in one or more stores over one or more past time periods;
train a first machine learning model to learn model parameters by identifying one or more causal factors that influence the sale of one or more items at one or more stores over one or more time periods, and to generate first predictions of the sales of one or more items in relation to one or more causal factors;
train a second machine learning model, based on the first machine learning model, to generate second predictions of the sales of one or more items, wherein the second machine learning model is trained to test a new feature branch, wherein the new feature branch comprises one or more new causal factors, the one or more new causal factors each describing a strength of a factor variable contributing to the second predictions, and wherein the second machine learning model is trained using different chronological segments of the historical time series sales data;
evaluate the predictions of the first and second machine learning models as compared to the historical time series sales data; and
deploy the machine learning model that generated the predictions that are closer to the historical time series sales data to generate one or more subsequent predictions.

9. The system of claim 8, further comprising the server, after deploying the machine learning model that generated the predictions that are closer to the historical time series sales data to generate one or more subsequent predictions:
predicting, with the deployed machine learning model, one or more demand quantities during a prediction period by training the deployed machine learning model on historical supply chain data assigned to a training period, wherein the training period is earlier than the prediction period, and each of the one or more demand quantities is associated with at least one item of the one or more items and at least one stocking location of the one or more stocking locations during the prediction period; and
rendering, for display on a user interface, a demand prediction visualization comprising a predicted demand and features identified during training of the deployed machine model that influenced the predicted value.

10. The system of claim 8, further comprising the server using a time-dependent cross-validation process to evaluate the predictions of the first and second machine learning models as compared to the historical time series sales data.

11. The system of claim 10, wherein the server uses an automatic continuous integration process, drawing information from sets of data from two or more supply chain entities, to test the generality of the predictions generated by the first and second machine learning models.

12. The system of claim 11, further comprising the second machine learning model incorporating one or more feature branches present in the first machine learning model, and one or more feature branches not present in the first machine learning model.

13. The system of claim 12, further comprising the server tracking the feature branches of the first and second machine learning models with a version-control system.

14. The system of claim 13, further comprising the server training the first and second machine learning models using a cyclic boosting process.

15. A non-transitory computer-readable storage medium embodied with software, the software when executed configured to:
receive, with a server comprising a processor and memory, historical time series sales data comprising aggregated sales data for one or more items sold in one or more stores over one or more past time periods, wherein the one or more stores maintain an inventory of one or more items at one or more stocking locations;
train a first machine learning model to learn model parameters by identifying one or more causal factors that influence the sale of one or more items at one or more stores over one or more time periods, and to generate first predictions of the sales of one or more items in relation to one or more causal factors;
train a second machine learning model, based on the first machine learning model, to generate second predictions of the sales of one or more, wherein the second machine learning model is trained to test a new feature branch, wherein the new feature branch comprises one or more new causal factors, the one or more new causal factors each describing a strength of a factor variable contributing to the second predictions, and wherein the second machine learning model is trained using different chronological segments of the historical time series sales data;
evaluate the predictions of the first and second machine learning models as compared to the historical time series sales data; and
deploy the machine learning model that generated the predictions that are closer to the historical time series sales data to generate one or more subsequent predictions.

16. The non-transitory computer-readable storage medium of claim 15, wherein the software when executed is further configured to, after deploying the machine learning model that generated the predictions that are closer to the historical time series sales data to generate one or more subsequent predictions:
predict, with the deployed machine learning model, one or more demand quantities during a prediction period by training the deployed machine learning model on historical supply chain data assigned to a training period, wherein the training period is earlier than the prediction period, and each of the one or more demand quantities is associated with at least one item of the one or more items and at least one stocking location of the one or more stocking locations during the prediction period; and
render, for display on a user interface, a demand prediction visualization comprising a predicted demand and features identified during training of the deployed machine model that influenced the predicted value.

17. The non-transitory computer-readable storage medium of claim 15, wherein the software when executed is further configured to use a time-dependent cross-validation process to evaluate the predictions of the first and second machine learning models as compared to the historical time series sales data.

18. The non-transitory computer-readable storage medium of claim 17, wherein the software when executed is further configured to use an automatic continuous integration process, drawing information from sets of data from two or more supply chain entities, to test the generality of the predictions generated by the first and second machine learning models.

19. The non-transitory computer-readable storage medium of claim 18, further comprising the second machine learning model incorporating one or more feature branches present in the first machine learning model, and one or more feature branches not present in the first machine learning model.

20. The non-transitory computer-readable storage medium of claim 19, wherein the software when executed is further configured to track the feature branches of the first and second machine learning models with a version-control system.

* * * * *